INVENTOR.
Donald J. Abel
ATTORNEY

INVENTOR.
Donald J. Abel
BY
ATTORNEY

3,499,333
MEANS FOR SUPPORTING AND TORQUING A ROTOR OF A MULTIPLE DEGREE OF FREEDOM GYROSCOPE
Donald J. Abel, Franklin Lakes, N.J., assignor to The Bendix Corporation, a corporation of Delaware
Filed Feb. 14, 1967, Ser. No. 616,075
Int. Cl. G01c *19/06*
U.S. Cl. 74—5.7                                                     8 Claims

ABSTRACT OF THE DISCLOSURE

This invention relates to means for supporting and torquing a rotor of a multiple degree of freedom gyroscope and more particularly to a multiple degree of freedom thrust type bearing supported rotor of a gyroscope and torquing means for restoring the multiple degree of freedom rotor to a normal spin axis position.

BACKGROUND OF THE INVENTION

Field of the invention

The invention pertains to a multiple degree of freedom gyroscope with essentially a thrust type bearing supported rotor and a means for torquing and restoring the rotor to normal spin axis position upon displacement of the rotor about an axis other than the spin axis.

Description of the prior art

Heretofore, gyroscopes have employed male spherical center support sections which are rigidly attached to a gimbal, frame or platform of the vehicle. One type for example is shown in U.S. Patent No. 2,815,584 granted Dec. 10, 1957 to J. R. Watson which invention requires radial bearings to be inserted within a female spherical section of a rotor at approximately 45 degree angles from the support center for rotation of the rotor about the convex spherical stationary shaft section. This type gyroscope has a disadvantage in that two rotor sections must be mated and balanced for assembly on the male spherical support section.

Further, in such a gyroscope the bearings require a waste of the mass space of the rotor giving rise to accuracy inefficiency since accuracy is a function of rotor angular momentum, and the latter a function of mass.

Further, while in the prior art there has been provided a type of gyroscope employing a spherical air bearing supported rotor such as shown in U.S. Patent No. 2,729,106, granted Jan. 3, 1956, to J. C. Mathiesen, such prior art type gyroscope has the inherent disadvantage that stability of the rotor requires the female spherical portion of the rotor to extend over a large area concentric with the male support section. This in turn is a function of the pressure and area over which the female rotating section encompasses the male support section so that increasing the area over which the rotor encompasses the male air bearing support section serves also to increase the undesirable factors of viscous and windage drag. Also, as the female section encompassing the male spherical section of the support bearing becomes greater, the angular allowance of freedom of movement of the female rotor section about the male spherical section becomes less.

SUMMARY OF THE INVENTION

In the present invention there is provided a gyroscope having a rotor which does not require the matching of two rotor halves, as in the Watson U.S. Patent No. 2,815,-584, but instead there is provided a structure which utilizes maximum mass space since thrust type bearings mounted external to the rotor support the rotor and the arrangement is such that the greatest degree of angular freedom of movement of the rotor is allowed without the use of supporting gimbals.

Further, the present invention easily dissipates heat since the thrust type bearings rotate external to the rotor.

Further, since machining is critical to rotor balance, the present invention provides for a one-piece rotor of which a spherical section is a part and rotates therewith. The structure in the present invention also allows alignment, for example, of the center of gravity with the center of rotation while the gyroscope is in running operation, which operation cannot be done in the type gyroscope manifested for example in the Watson patent.

Further, the invention provides a thrust type bearing, but which has a circumferentially surrounding wall portion so arranged as to additionally provide radial support of a load rotatable therein.

Further, the invention provides for a unitary restoring mechanical torque means comprising a flexible torque member inserted through a spherical rotor having a hollow channel therethrough so as to restore the rotor to a normal spin axis position upon motion of the rotor occurring about any axis perpendicular to the spin axis. The flexible torque member is symmetrical such that it provides the same restoration force for the same angular movement of the rotor about any such axis perpendicular to the spin axis.

It is within the contemplation of this invention to provide a novel rotor structure wherein the rotor has a male spherical section at its center rotatable and integral therewith and thrust type bearing external to the rotor, thereby eliminating the necessity of radial bearings on a support shaft or within the rotor.

It is another object of this invention to provide a multiple degree of freedom gyroscope having a one-piece rotor.

It is a further object of this invention to provide a multiple degree of freedom gyroscope having a rotor supported by a thrust type bearing or ring of balls which exerts little friction on mass movement since the mass is at a much greater moment arm than the bearings.

It is a further object of this invention to provide a one-piece rotor having a spherical center portion supported by thrust type bearings so as to eliminate the necessity of matching a female section of the rotating mass with the male support section.

It is a further object of this invention to provide a gyroscope having no support shafts.

It is a further object of this invention to provide a means external to the rotor for alignment and centering of the rotor while the rotor is in spin operation.

It is a further object of this invention to provide a one-piece rotor having an opening extending therethrough coaxial with the spin axis of the rotor for insertion therein of a flexible torque member to restore the rotor to normal spin axis position upon movement of the same about any axis perpendicular to the spin axis of the rotor (gyroscope).

A further object of the invention is to provide a symmetrical and flexible torque member inserted through the rotor of a gyroscope to restore with the same force, the rotor of the gyroscope upon movement of the rotor a given angle about any axis perpendicular to the spin axis.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
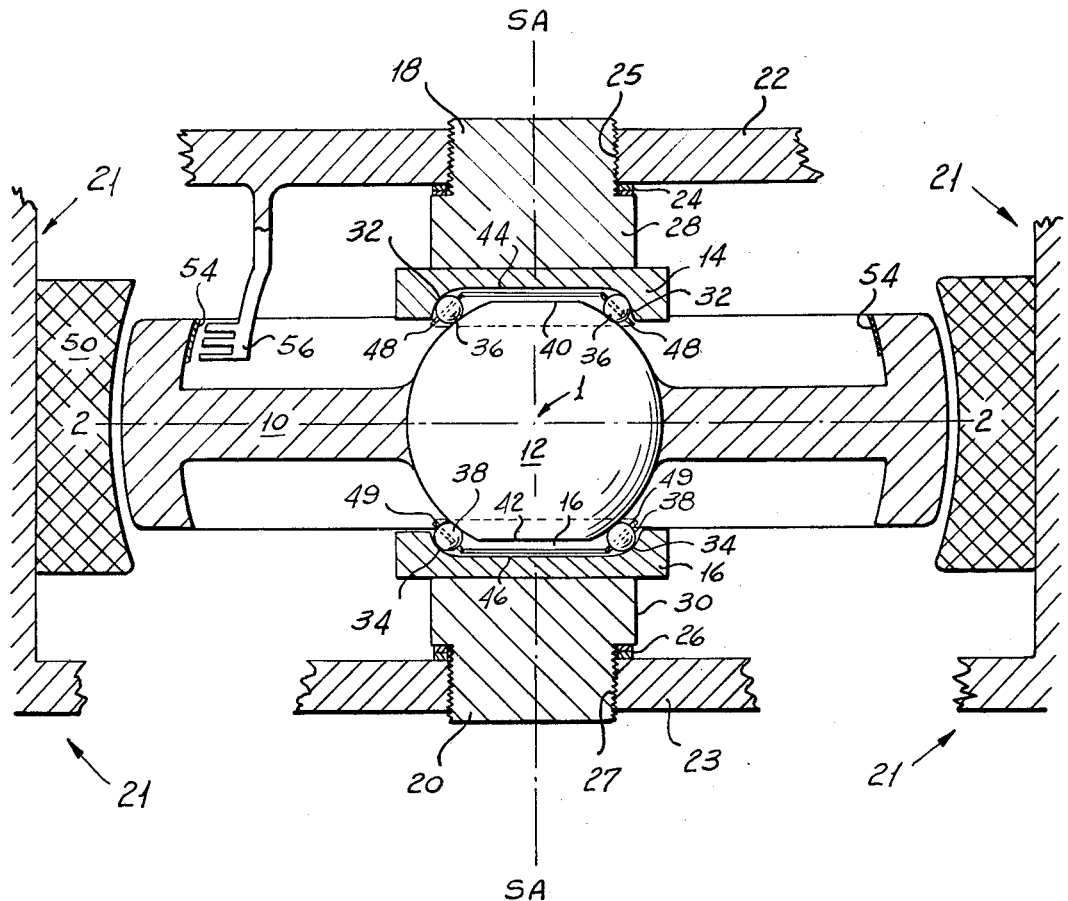
FIGURE 1 is a cross-sectional view of a multiple degree of freedom gyroscope embodying the invention.

Referring to FIGURE 1, there is shown a rotor 10 having a spherical support center section 12 formed integral therewith and supported at the spherical center section 12 about a spin axis SA in diametrical opposition at opposite sides by thrust type bearings 14 and 16. The thrust type bearings 14 and 16 are mounted and held in place by adapters 18 and 20, respectively, which are attached to suitable stabilized portions 22 and 23 of a frame 21 which may be mounted on a moving vehicle, aircraft or outer space vehicle. The adapters 18 and 20 include screw threaded portions 25 and 27 engageable in suitable screw threads provided in the frame portions 22 and 23 so as to be adjustably positioned in a predetermined relation by means of shims 24 and 26' being placed between shoulder sections 28 and 30 of the adapters 18 and 20 and suitable stabilized platform frame portions 22 and 23.

The thrust type bearings 14 and 16 have inner races 32 and 34 for contact with bearing balls 36 and 38 in an approximately 45° relationship with the spin axis SA. The spherical center section 12 of rotor 10 has flat end portions 40 and 42 transverse to the spin axis SA and at opposing ends of the spherical center section 12 so as to prohibit contact of the sphere 12 of rotor 10 with the inner sections 44 and 46 of the thrust type bearings 14 and 16. The bearing balls 36 are held in spaced relationship within the thrust type bearing 14 by means of a circular spacer 48 which holds the bearing balls 36 in a fixed relationship to each other and which allows rotation of the bearing balls 36 within the spacer 48. Similarly, the bearing balls 38 are held in spaced relationship within the thrust type bearing 16 by means of a circular spacer 49 which holds the bearing balls 38 in a fixed relationship to each other while allowing rotation of the bearing balls 38 within the spacer 49.

There are further provided motor windings 50 affixed to frame 21 and mounted about the circumference of, but not in contact with the rotor 10. The motor windings 50 are suitably excited to provide the electromagnetic driving forces for effecting rotation of the rotor 10 about its spin axis SA.

The rotor 10 has suitable ferro magnetic material mounted about the inner peripheral surface 54 thereof so as to complete a magnetic circuit whereby an electromagnetic field is produced to induce signal current in windings of a conventional E-transformer magnetic pole pickoff or sensing mechanism 56 which may be of a type such as described in a U.S. Patent No. 2,729,106 granted Jan. 3, 1956 to J. C. Mathiesen.

Figure 2:
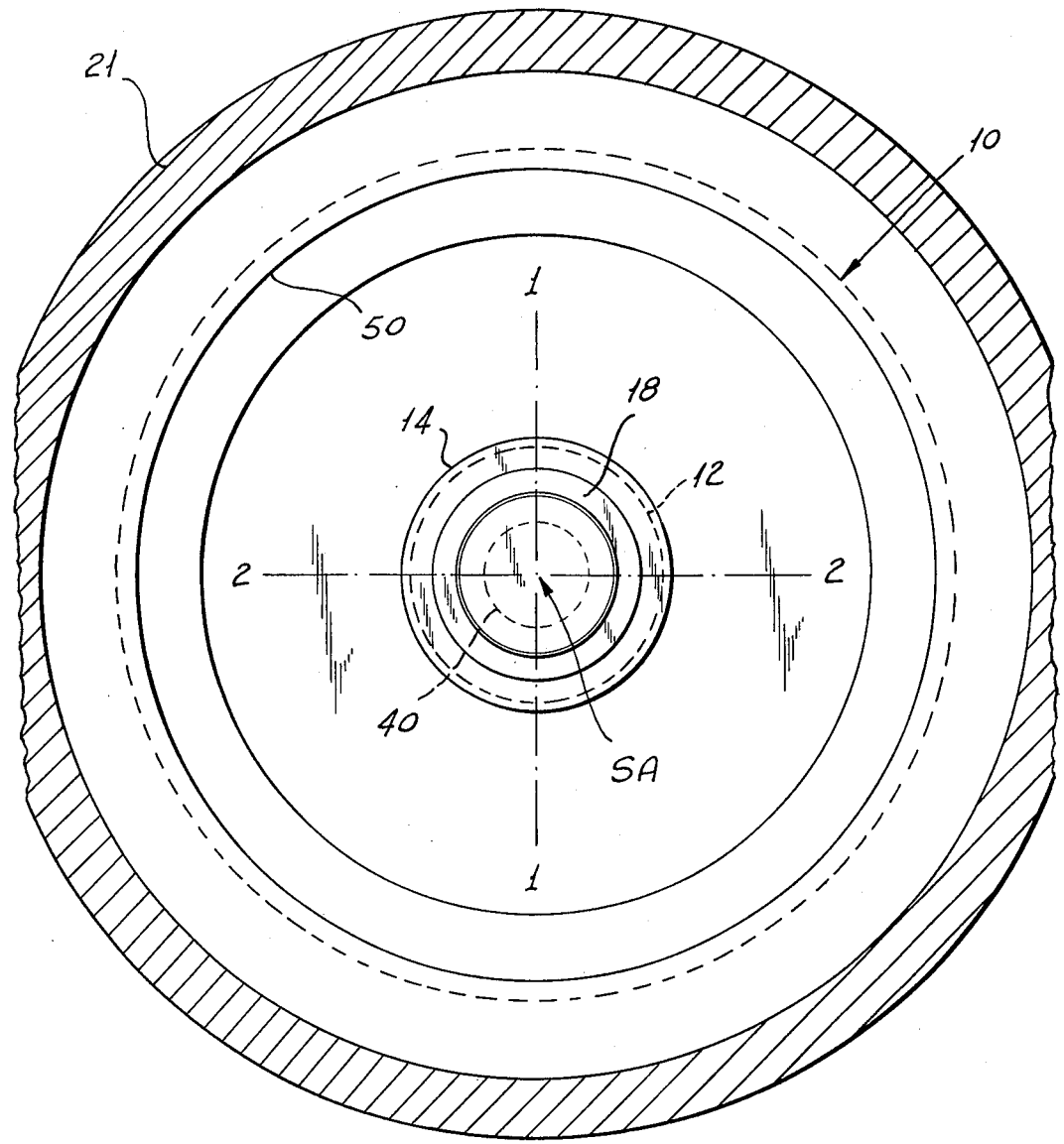
FIGURE 2 is a top plan view of FIGURE 1 with the frame broken to better illustrate the operative parts therein.

The E-transformer sensing mechanism 56 is rigidly attached to the frame portion 22 adjacent to the rotor 10 so as to provide a suitable transducer for sensing the angular position or movement of the rotor 10 about an output axis 1—1 perpendicular to spin axis SA, as shown in FIGURE 2. Similarly, another E-transformer magnetic pole piece pickoff or sensing mechanism (not shown) is mounted to the frame 22 adjacent to the rotor 10 and 90° displaced from pickoff 56 to detect angular movement or angular position of the rotor about an output axis 2—2 as shown in FIGURES 1 and 2 which axis is perpendicular to the spin axis SA and also to the output axis 1—1.

Figure 3:
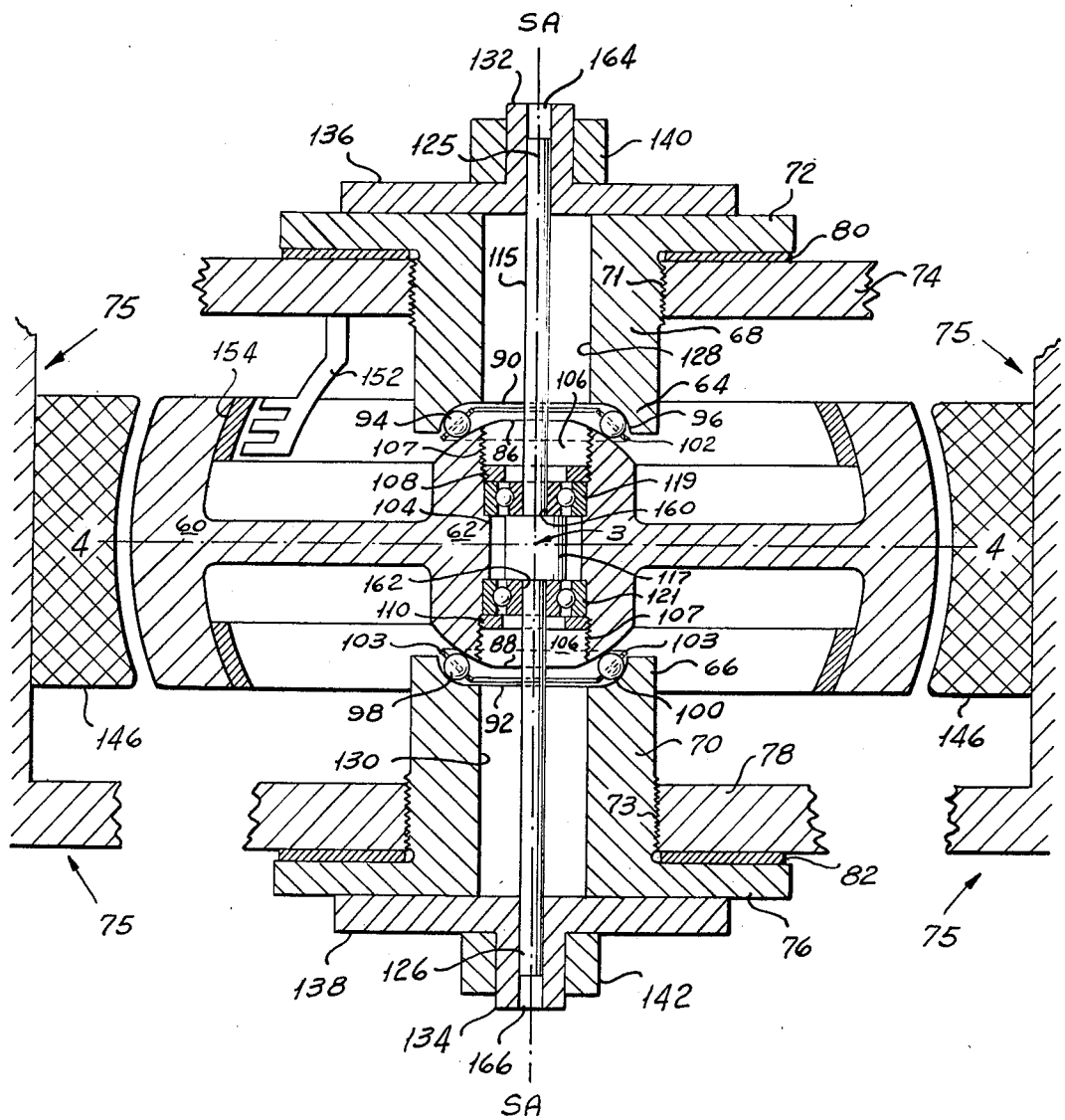
FIGURE 3 is a cross-sectional view of a multiple degree of freedom gyroscope embodying a modified form of the invention.

Referring now to the modified form of the invention of FIGURE 3, there is shown a rotor 60 having a spherical support section 62 mounted in thrust type bearings 64 and 66 which are fixedly mounted and attached to adapters 68 and 70.

The adapters 68 and 70 include screw threaded portions 71 and 73 engageable in suitable screw threads provided in frame portions 74 and 78 so as to be adjustably positioned therein.

The adapter 68 has a circular shoulder section 72 for mounting the adapter 68 to a portion 74 of a frame 75 which may be mounted on a moving vehicle, aircraft or outer space vehicle. The adapter 70 has a circular shoulder portion 76 for mounting the adapter 70 in adjustable relationship with another portion 78 of the frame 75. Circular shims 80 may be inserted between the shoulder portion 72 and frame portion 74 for determining the adjusted position of the adapter 68 and thereby the position of the thrust type bearing 64. Shims 82 may be inserted between the frame portion 78 and the shoulder section 76 of the adapter 70 for determining the adjusted position of the adapter 70 and thereby the position of the bearing 66. There is thus provided an adjustment of the adapter 70 and the bearing 66 with respect to the stabilized frame portion 78. The spherical center section 62 has flat portions 86 and 88 in diametrical opposition along the spin axis SA so as to prevent contact of the spherical center section 62 with the inner portions 90 and 92 of the thrust type bearings 64 and 66.

Bearing balls 94 are shown in contact with the race 96 of thrust bearing 64 at approximately 45° from the center of rotation of rotor 60, while bearing balls 98 are shown in contact with a race 100 of the thrust type bearing 66 in approximately 45° contact with the race 100 with respect to the center of rotation of the rotor 60.

The bearing balls 94 and 98 are held in fixed separated relationship with respect to each other by means of suitable retainers 102 and 103 which are inserted within the thrust type bearings 64 and 66, respectively, so as to allow spacing of balls 94 and 98 therein. At the flat portions 86 and 88 of the spherical rotor section 62, a circular hole or channel 104 bored therethrough is counter bored as at channel 106 which may be threaded at 107 for insertion of locknuts 108 and 110.

In assembly, a flexible torque member 115, having cylindrical shoulder portion 117 is inserted in one end of rotor section 62 through the channels 104 and 106 and out the other end of rotor section 62. The shoulder 117 of flexible torque member 115 is of an axial length equal to the axial length of bore 104 so that duplex bearings 119 and 121 may be inserted in counter bores 106 at opposing ends of both bore 104 and of shoulder portion 117 of the flexible torque member 115 so as to thereby center the shoulder 117 within rotor 60.

The locknuts 108 and 110 are screw threaded into counter bores 106 and hold the duplex bearings 119 and 121 in fixed axial position within the rotor 60. The opposing ends 125 and 126 of the flexible torque member 115 extend through bores 128 and 130 in adapters 68 and 70 and are held in place with respect to the frame portions 74 and 78 in sliding relationship by a means of retainers 132 and 134 having shoulder portions 136 and 138 against adapter shoulders 72 and 76. Suitable clamps 140 and 142 are positioned circumferentially about the retainers 132 and 134 so as to provide a means to adjust by loosening or tightening the clamps 140 and 142, the slidable fitting relationship of the flexible torque member 115 within the retainers 132 and 134 for the most practical operational results.

Stator windings 146 are fixedly mounted on the frame 75 circumferentially positioned about the rotor 60 so as to provide the drive means of the rotor 60 about its spin axis. A suitable E-transformer pickoff 152 having three pole pieces such as described with reference to FIGURE 1 may be mounted to the portion 74 of the frame 75 whereby the pole pieces are adjacent to an inner surface 154 of rotor 60 so as to detect motion of the rotor about an output axis 3 perpendicular to spin axis SA and extending through and perpendicular to the plane of the paper. Similarly, another E-transformer (not shown) may be placed in 90° relationship about the spin axis from transformer 152 so as to detect motion of the rotor 60 about an output axis 4—4, as shown in FIGURE 3.

OPERATION

Referring to FIGURES 1 and 2, the rotor 10 of the two degree of freedom gyroscope is rotatably driven about the spin axis SA by means of an electromagnetic field created by the current in the stator windings 50. The spherical rotor section 12 rotates in the thrust type bearings 14 and 16. Upon full operational speed of approximately 24,000 r.p.m., the ring of bearing balls 36 and 38 function to guide rather than constrain the rotor about its center of rotation such that the rotor 10 will float in the magnetic field.

Upon precession forces being present, the bearing balls 36 and 38 of the thrust type bearings 14 and 16 serve to support and guide the rotor about its torque center, the balls adjusting in a typical manner of a thrust bearing so that eqaul loading exists on the bearing balls 36 and 38. The bearing races 32 and 34 having the bearing balls 36 and 38 therein may be adjusted while the rotor is in operation so as to align the center of gravity of the rotor 10 with the center of rotation which is determined by the magnetic field so as to prevent the bearing balls 36 and 38 from constraining the rotor 10 in operation. Such alignment in axial direction and further reducing or lessening of the pressure of bearing balls 36 and 38 on the spherical rotor of section 12 may be performed by placement of the shims 24 and 26 between the shoulder sections 28 and 30 of adapters 18 and 20 and the stabilized frame portions 22 and 23. Eccentric adjustment of the thrust type bearings 14 and 16 may be accomplished by positioning the bearings 14 and 16 away from the spin axis of the rotor in a radial direction; that is, adjusting the bearings 14 and 16 in the direction of axes 1—1 or 2—2 with respect to frame portions 22 and 23.

Precessional motion of the rotor may take place about any axis through the center of the rotor which is perpendicular to the spin axis SA as in a typical two degree of freedom gyroscope. Since the male spherical section 12 is part of the large rotating mass of the rotor 10, any resistive torques of the bearing balls 36 and 38 in the thrust type bearings 14 and 16 is relatively small compared to the driving torque of the rotor at operational speeds, since such a resistive torque acts at a small radius from the center of rotation of the rotating mass comprising the rotor 10. The length of this radius is the distance from the center of the thrust type bearings 14 and 16 to the center of bearing balls 36 and 38, respectively, which cause the resistive force. Further, eccentric adjustment of the adapters 18 and 20 with respect to the frame portions 22 and 23 may be made so as to control slippage in a radial direction of the bearing balls 36 and 38 in the inner races 32 and 34 of the thrust type bearings 14 and 16.

Further, radial slippage from the spin axis is small compared to the rotational movement of the spherical center section 12 of rotor 10 about the spin axis SA and such radial movement in a thrust type bearing is characteristically less than that of a radial bearing employed for the same purpose.

In the operation of the structure of FIGURE 3, the conventional stator windings 146 are energized to drive the rotor 60 about the spin axis SA. At the operational speed of the rotor 60, the bearing balls 94 and 98 are forced into contacting relation with surfaces of the spherical center section 62.

The spherical center section 62 may be adjusted by positioning the adapters 68 and 70 with respect to the frame portions 74 and 78 by means of the shims 80 placed between the shoulder section 72 of adapter 68 and the frame portion 74 and by means of the shims 82 between the shoulder section 76 of the adapter 70 and the frame portion 78. The mating of the circle of bearing balls 94 and 98 in the thrust type bearings 64 and 66 is thus accomplished since the thrust type bearings 64 and 66 are mounted at inner ends of the adapters 68 and 70, respectively.

Similarly, such practical alignment by use of the shims 80 and 82 may be performed so as to attain spin of the rotor about the axis SA with no movement about other axes while no external torque is present. Upon angular motion of rotor 60 about the output axis 3 into the plane of the paper, the E-transformer pickoff 152 indicates a corresponding signal indicative of such angular displacement. Similarly, the other E-transformer pickoff (not shown) being mounted 90° about the spin axis from the E-transformer pickoff 152 is operative to detect motion of the rotor about output axis 4—4. Both E-transformer pickoffs may be used in the initial alignment process while no external torque is applied to the gyroscope so that the thrust type bearings 64 and 66 may be so adjusted as to operatively restrict motion of rotor 60 about any axis other than the spin axis SA.

The flexible member 115 extending through the spherical rotor section 62 of the rotor 60 is not in dynamic motion during the spin operation of the rotor 60. The duplex bearings 119 and 121 being held in place in bore 106 are prohibited from axial movement with respect to rotor 60 by locknuts 108 and 110. Rotation of the rotor 60 does not produce a load on the torque member since the duplex bearings 119 and 121 isolate the torque member 115 from the rotor 60. The load of the rotor 60 in rotation and thrust about the spin axis SA is supported by the guiding bearing balls 94 and 98 in the thrust bearings 64 and 66. Upon motion of the rotor about either of the two degrees of freedom indicated by output axes 3 and 4—4 or any axis in a plane defined thereby perpendicular to the spin axis, the flexible torque member 115 is operative to restore the rotor back to normal spin axis position and the pickoff signals from E-transformer pickoffs such as 152 may be calibrated with respect to corresponding angular rotation of the rotor 60 with relation to the frame 75.

If the rotor 60 precesses in counterclockwise direction about the output axis 3, as viewed in FIGURE 3, one side 160 of an inner race of the duplex bearing 119 is compressed against the adjacent side of the flexible torque member 115 at an upper surface of the shoulder portion 117. Similarly, an opposite side 162 of an inner race of the duplex bearing 121 is compressed against the adjacent side of the flexible torque member 115 at a lower surface of the shoulder portion 117.

Thus, if the precession of the rotor 60 causes counterclockwise motion of the rotor 60 about the input axis, the stiffness of the flexible torque member is operative to produce a clockwise torque about the same axis so as to restore the rotor 60 to the normal spin axis position. The E-transformer pickoff 152 detects the precession of the rotor 60 about the output axis 3 immediately upon precession and before restoration of the rotor 60 by the flexible torque member 115.

Since the torque member 115 extends longitudinally through the spherical center section 62 coaxial with the spin axis and is circular about its periphery and has the shoulder portion 117 circular in cross section, the flexible torque member 115 operates as already described if precession of the rotor 60 takes place about any other axis in the plane transverse to the spin axis. Further, it is anticipated that the random flexing of the torque member 115 because of a precession about the various axes perpendicular to the spin axis will allow uniform restoration of rotor 60 over long operational periods.

The retainers 132 and 134 attached to the shoulder sections 72 and 76 of the adapters 68 and 70 support the flexible torque member 115 relative to the frame portions 74 and 78. Since motion of rotor 60 about any of the axes perpendicular to the spin axis causes the flexible torque member 115 within the spherical rotor section 62 to flex about the same axis a slight longitudinal or axial movement of the torque member 115 takes place. Therefore, the external ends 125 and 126 of the torque member are initially slideably fitted in slots or channels 164 and 166 of the retainers 132 and 134. The clamps 140 and 142 may be tightened or loosened so as to regulate the frictional engagement of the retainers 132 and 134 with the opposite ends 125 and 126 of the flexible torque member 115 so as to provide the most practical operational results and to control the axial movement of the flexible torque member 115 with respect to the retainers 132 and 134.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A gyroscope to measure the attitude of a moving vehicle, a platform frame mounted on said vehicle, a rotor, and means for driving the rotor about a spin axis, wherein the improvement comprises:

the rotor including a center section with spherical surface portions integral and rotatable therewith; and thrust type bearings having bearing balls therein for contact with the spherical surface portions of the center section in such a manner as to permit angular freedom of movement of the rotor about an axis perpendicular to the spin axis and to provide external support of the rotor at diametrically opposite ends of the center section.

2. The combination defined by claim 1 including: adjusting means for varying the contact and support forces exerted by the thrust type bearing on the spherical surface portions of the center section.

3. The combination defined by claim 2 wherein the adjusting means includes:

adapters having flanged shoulder portions; and shims between the adapter shoulder portions and the platform frame;

the adapters being mounted to the thrust type bearings so as to hold the thrust type bearing in fixed position relative to the platform frame; and the shims being placed on the adapter shoulder section to adjust the adapters and thrust type bearings to the center section of the rotor so as to center the rotor in relation to a center of the means for driving the rotor and to reduce end play fluctuations of the rotor from the spin axis thereof.

4. The combination defined by claim 1 including:

the center section of the rotor having a channel extending therethrough coaxial with the spin axis of the rotor;

mechanical torque means extending through the channel and outwardly from the rotor; and retainer means external to the rotor for support of the mechanical torque means;

the mechanical torque means being operative to restore the rotor to normal position about the spin axis upon motion of the rotor about the axis perpendicular to the spin axis; and the retainer means being adjustably positioned with respect to the platform frame.

5. The combination defined by claim 4 including:

holding means within the channel;

the holding means being effective to hold the mechanical torque means in a fixed axial and radial position within the channel.

6. The combination defined by claim 5 wherein the mechanical torque means includes:

a one-piece flexible torque member having opposite ends extending from within the center section and a shoulder portion cylindrical in shape and circular in cross section of predetermined diameter within the channel and between the ends;

the torque member being resilient so as to bend about the axis perpendicular to the spin axis of the rotor upon a corresponding torque applied to the rotor being transmitted from the rotor through the holding means to the flexible torque member.

7. The combination defined by claim 6 wherein the holding means includes:

radial bearings at opposite ends of the shoulder portion of the flexible torque member; and the radial bearings being operative to transmit torque from the rotor about the axis perpendicular to the spin axis to the flexible torque member and simultaneously to prevent loading of the rotor against rotation about the spin axis.

8. The combination defined by claim 6 wherein the retainer means includes:

retainer elements having channels; and clamping elements on the retainer elements;

the channels of the retainer elements being of predetermined dimension so as to receive in slidable relation opposite ends of the flexible torque member; and the clamping elements being adjustable so as to restrict the sliding relationship of the opposite ends of the flexible torque member in the retainer.

References Cited

UNITED STATES PATENTS

| 805,096 | 4/1968 | Russell. | |
| 2,445,388 | 7/1948 | Carlson | 74—5.7 X |
| 3,077,785 | 2/1963 | Stiles | 74—5 |
| 3,321,979 | 5/1967 | Blazek et al. | 74—5 |

ROBERT A. O'LEARY, Primary Examiner

WILLIAM E. WAYNER, Assistant Examiner

U.S. Cl. X.R.

74—5